United States Patent
Liu et al.

(10) Patent No.: US 9,449,209 B1
(45) Date of Patent: Sep. 20, 2016

(54) 3D-STRUCTURED PATTERN READING SYSTEM

(71) Applicants: LUSTROUS ELECTRO-OPTICS LTD., New Taipei (TW); LUSTROUS TECHNOLOGY LTD., New Taipei (TW)

(72) Inventors: Chia-Chi Liu, New Taipei (TW); Chih-Wei Tsai, New Taipei (TW)

(73) Assignees: LUSTROUS ELECTRO-OPTICS LTD., New Taipei (TW); LUSTROUS TECHNOLOGY LTD., New Taipei (TW)

( * ) Notice: Subject to any disclaimer, the term of this patent is extended or adjusted under 35 U.S.C. 154(b) by 0 days.

(21) Appl. No.: 15/134,925

(22) Filed: Apr. 21, 2016

(51) Int. Cl.
*G06K 7/10* (2006.01)
*G06K 7/14* (2006.01)

(52) U.S. Cl.
CPC ......... *G06K 7/10722* (2013.01); *G06K 7/1426* (2013.01)

(58) Field of Classification Search
USPC ................................ 235/454, 462.01–462.49
See application file for complete search history.

(56) References Cited

U.S. PATENT DOCUMENTS

| | | | |
|---|---|---|---|
| 2005/0199720 A1* | 9/2005 | Barkan | G02B 3/14 235/454 |
| 2006/0196945 A1* | 9/2006 | Mendels | G06K 1/12 235/470 |
| 2014/0166758 A1* | 6/2014 | Goren | G06K 7/10801 235/462.21 |
| 2015/0060550 A1* | 3/2015 | Nunnink | G02B 3/14 235/462.41 |
| 2015/0269403 A1* | 9/2015 | Lei | G06K 7/10792 235/462.24 |

* cited by examiner

*Primary Examiner* — Daniel Hess
(74) *Attorney, Agent, or Firm* — Guice Patents PLLC

(57) ABSTRACT

A 3D-structured pattern reading system, including: an object having a front face formed with a 3D-structured pattern for representing predetermined data; and a reading device including a camera unit and a liquid lens unit, wherein the liquid lens unit has a variable focal length controlled by the camera unit to scan the 3D-structured pattern to derive the predetermined data with the object being placed at a distance not exceeding a maximum limit of the variable focal length from the liquid lens unit.

10 Claims, 4 Drawing Sheets

3D-STRUCTURED PATTERN READING SYSTEM

BACKGROUND OF THE INVENTION

1. Field of the Invention

The present invention relates to an image scan system, especially to a reading system for a three-dimensionally structured pattern on an object.

2. Description of the Related Art

Conventional image scanners are devices that optically scan an image, printed text, or handwriting, and those commonly used in offices are desktop flatbed scanners where the document is placed on a glass window for scanning. However, these desktop flatbed scanners can only scan a planar surface of a flat object to get a planar image.

To get a 3D image of an object, a 3D scanner is needed. A 3D scanner is a device that collects data on the shape and possibly color of an object. Many different technologies including contact 3D scanners and non-contact 3D scanners have been developed, and these 3D scanners are used extensively by the entertainment industry in the production of movies and video games, and other common applications of these 3D scanners include industrial design, prosthetics, reverse engineering and prototyping. However, these conventional 3D scanners all occupy a relative large space and not compact and robust enough.

To solve the foregoing problems, a novel 3D scanner is needed.

SUMMARY OF THE INVENTION

One objective of the present invention is to disclose a 3D-structured pattern reading system, which is capable of utilizing a variable focal length of a liquid lens to read a 3D-structured pattern of an object.

Another objective of the present invention is to disclose a 3D-structured pattern reading system to provide a novel 3D encryption system for anti-counterfeiting applications.

Still another objective of the present invention is to disclose a portable 3D-structured pattern reading apparatus to provide an authentication tool for a 3D encryption system.

To attain the foregoing objectives, a 3D-structured pattern reading system is proposed, including:

an object having a front face formed with a 3D-structured pattern for representing predetermined data; and a reading device including a camera unit and a liquid lens unit, wherein the liquid lens unit has a variable focal length controlled by the camera unit to scan the 3D-structured pattern to derive the predetermined data with the object being placed at a distance not exceeding a maximum limit of the variable focal length from the liquid lens unit.

In one embodiment, the 3D-structured pattern includes at least two planar patterns at different planes perpendicular to a normal line of the front face, and the at least two planar patterns carry information of the predetermined data.

In one embodiment, at least one of the at least two planar patterns is encrypted.

In one embodiment, the camera unit includes an information processing unit for performing an image processing procedure on the at least two planar patterns to derive the predetermined data.

In one embodiment, the image processing procedure includes a deciphering procedure.

In one embodiment, the camera unit further includes a light source.

In one embodiment, the reading device further includes a recession space accommodating the liquid lens unit and the recession space has a depth less than the maximum limit of the variable focal length.

In one embodiment, the reading device further includes at least one status indicator for indicating at least one operation status.

In one embodiment, the object is a label on a product or a card for accessing a resource or entering a controlled space.

To attain the foregoing objectives, a portable 3D-structured pattern reading apparatus is proposed, including:

a camera unit and a liquid lens unit, wherein the liquid lens unit has a variable focal length controlled by the camera unit for scanning a 3D-structured pattern on an object to derive predetermined data represented by the 3D-structured pattern with the object being placed at a distance not exceeding a maximum limit of the variable focal length from the liquid lens unit; and at least one status indicator for indicating at least one operation status of the camera unit.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 1b illustrates a top view of the front face of an object having a 3D-structured pattern shown in FIG. 1a.

DETAILED DESCRIPTION OF THE PREFERRED EMBODIMENTS

Figure 1A:
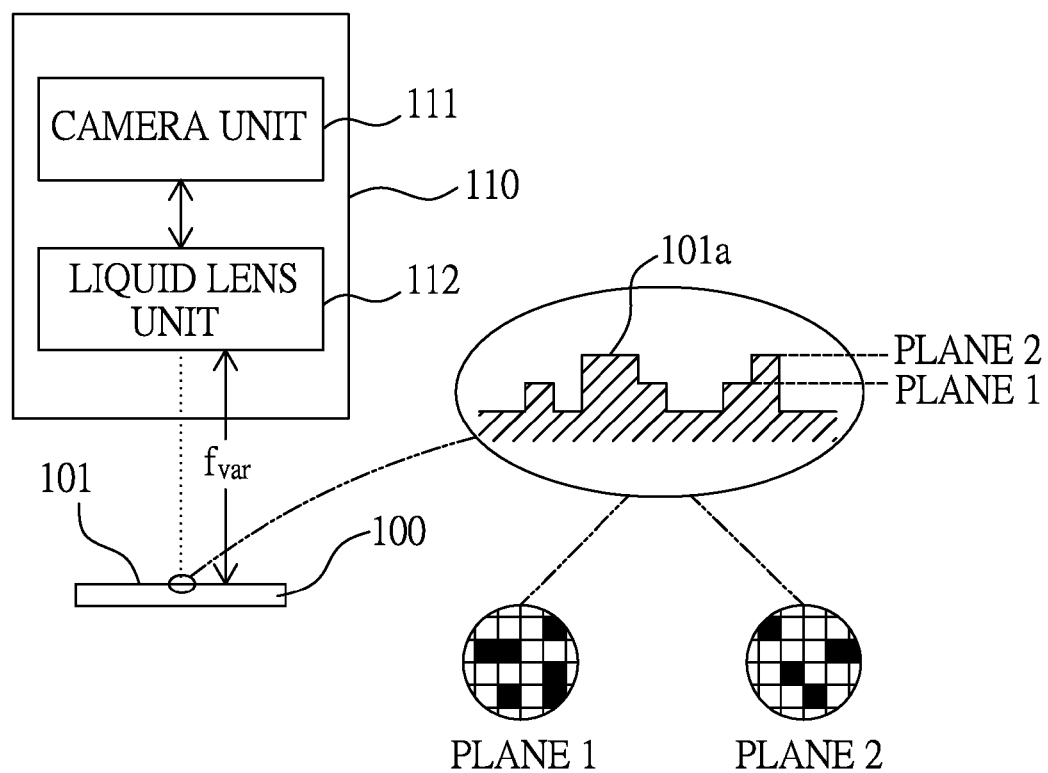
FIG. 1a illustrates an embodiment of a 3D-structured pattern reading system of the present invention.

Please refer to FIG. 1a, which illustrates an embodiment of a 3D-structured pattern reading system of the present invention. As illustrated in FIG. 1a, the 3D-structured pattern reading system includes an object 100 and a reading device 110.

The object 100 has a front face 101 formed with a 3D-structured pattern 101a for representing predetermined data. The 3D-structured pattern 101a can be formed by a laser cutting process or an etching process or an additive manufacturing process (such as 3D printing process).

The 3D-structured pattern 101a can provide at least two planar patterns at different planes (of which plane 1 and plane 2 are indicated in FIG. 1a) perpendicular to a normal line of the front face 101, and the at least two planar patterns carry information of the predetermined data. The at least two planar patterns can be further encrypted separately or together, and the encryption manners can have a great many possibilities like adding a secret key pattern, choosing a particular zone for the predetermined data, or using a predetermined random manner to correspond the at least two planar patterns with the predetermined data, etc. The object can be a label on a product or a card for accessing a resource or entering a controlled space, and with the arrangement of the 3D-structured pattern mentioned above, the access security of the resource or the controlled space can be greatly enhanced.

Figure 1B:
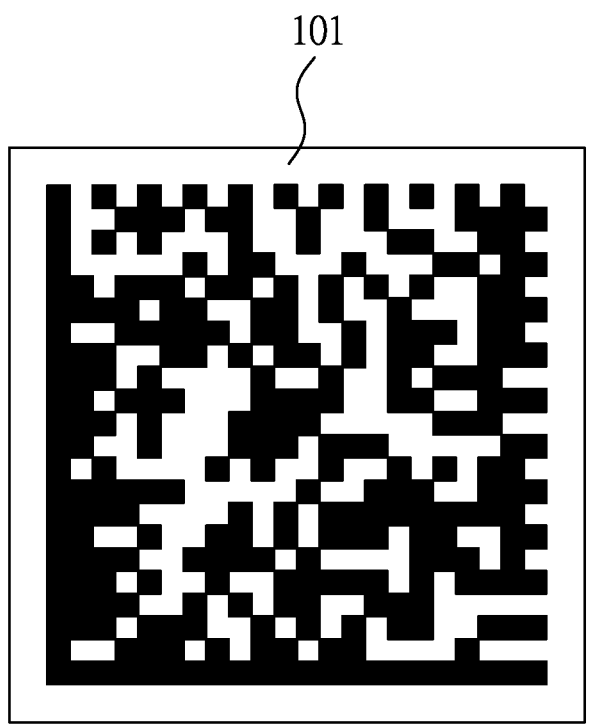

FIG. 1b illustrates a top view of the front face 101, in which the at least two planar patterns are projected onto a same plane to display a 2D image of a complex planar pattern, and it would be hard to derive or read the at least two planar patterns from the complex planar pattern because there are no clues on the 2D image to distinguish them. That is, without the knowledge of the locations of the planes carrying the at least two planar patterns along the normal line of the front face 101, a conventional scan process on the front face 101 would simply have the result of projecting the at least two planar patterns onto a same plane, and the resultant image would be a 2D image of a complex pattern, and it would be nearly impossible to tell which part of the complex pattern belongs to which one of the at least two planar patterns.

The reading device 110 includes a camera unit 111 and a liquid lens unit 112, wherein the liquid lens unit 112 has a variable focal length $f_{var}$ controlled by the camera unit 111 to scan the 3D-structured pattern 101a to derive the predetermined data with the object 100 being placed at a distance not exceeding a maximum limit (about 10 cm, for example) of the variable focal length $f_{var}$ from the liquid lens unit 112. The variable focal length $f_{var}$ can be achieved by applying an electric field to the liquid lens unit 112 to change the curvature of a liquid lens therein. As a liquid lens has the advantages of small size and controllable focal length over conventional lens, the reading device 110 can be very handy and compact.

The camera unit 111 can include an information processing unit for performing an image processing procedure on the at least two planar patterns to derive the predetermined data, and the image processing procedure can include a deciphering procedure.

Besides, the camera unit 111 can further include a light source to facilitate the reading process.

Besides, the reading device 110 can further include a recession space to accommodate the liquid lens unit 112, and the recession space has a depth less than the maximum limit of the variable focal length so as to ensure a proper distance between the object 100 and the liquid lens unit 112 when the reading device 110 is performing the reading process.

Besides, the reading device 110 can further include at least one status indicator to indicate at least one operation status, and the at least one status indicator can be implemented by at least one LED (light emitting diode). The at least one status indicator can indicate whether the object 100 is within a readable range, or whether the reading process is finished. In addition, the reading device 110 can also make different beeping sounds to indicate different operation statuses.

As can be seen in the description above, the liquid lens based reading device together with the 3D-structured pattern arrangement of the present invention can make a handy and compact 3D reading system, and the handy and compact 3D reading system can offer a powerful anti-counterfeiting function by a 3D encryption scheme, which is much more difficult to break than conventional encryption schemes.

Figure 2:
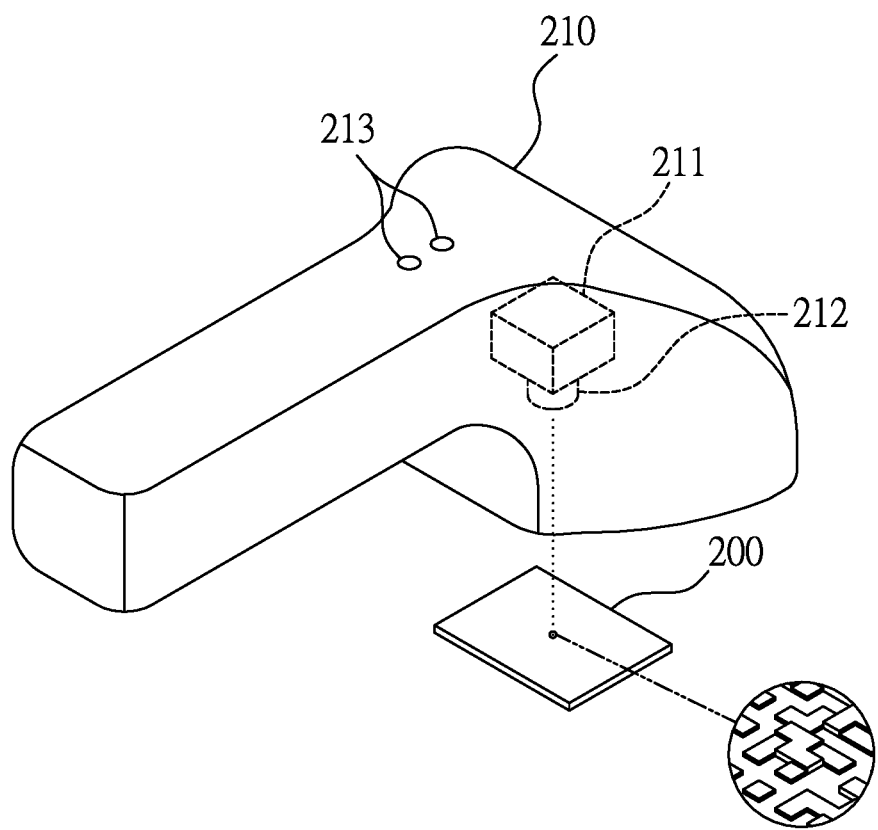
FIG. 2 illustrates an embodiment of a portable 3D-structured pattern reading apparatus of the present invention.

Please refer to FIG. 2, which illustrates an embodiment of a portable 3D-structured pattern reading apparatus of the present invention. As illustrated in FIG. 2, the portable 3D-structured pattern reading apparatus includes a body 210, a camera unit 211, a liquid lens unit 212, and at least one status indicator 213.

The liquid lens unit 212 has a variable focal length $f_{var}$ controlled by the camera unit 211 for scanning a 3D-structured pattern on an object 200 to derive predetermined data represented by the 3D-structured pattern with the object 200 being placed at a distance not exceeding a maximum limit of the variable focal length $f_{var}$ from the liquid lens unit 212.

The at least one status indicator 213 is placed on (or inside) the body 200 for indicating at least one operation status of the camera unit 211.

Figure 3:
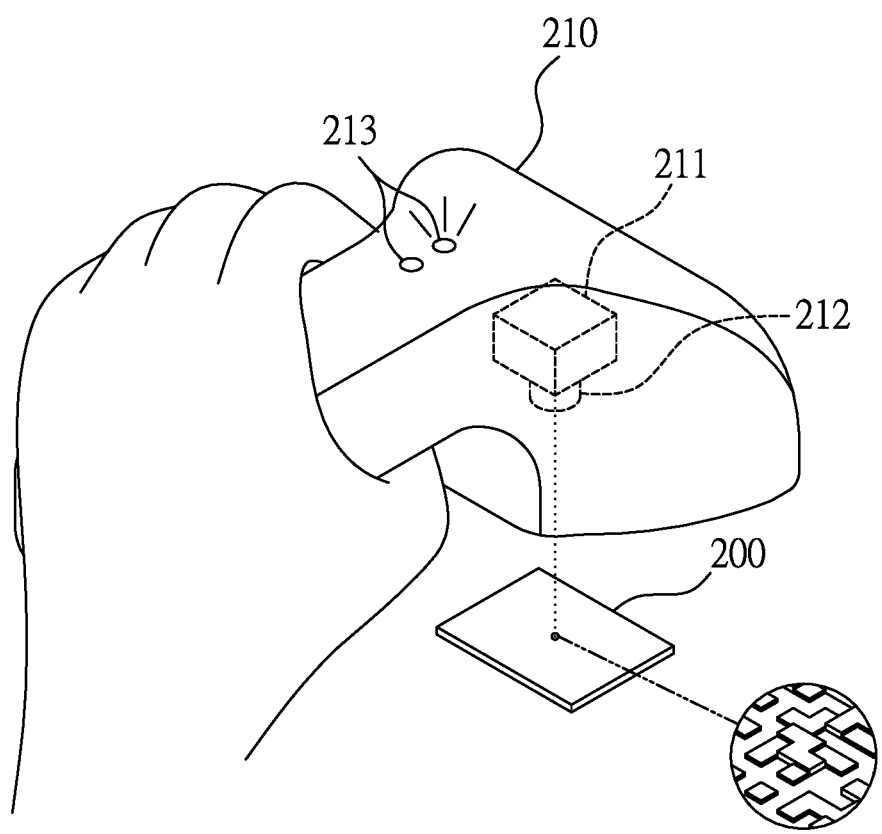
FIG. 3 illustrates an operation scenario of a portable 3D-structured pattern reading apparatus of the present invention.

Please refer to FIG. 3, which illustrates an operation scenario of a portable 3D-structured pattern reading apparatus of the present invention. As illustrated in FIG. 3, when the portable 3D-structured pattern reading apparatus approaches the object 200 for deriving predetermined data represented by a 3D-structured pattern, the at least one status indicator 213 will indicate whether the object is within a readable range and whether planar patterns at different planes perpendicular to a normal line of the 3D-structured pattern have been read.

Thanks to the designs mentioned above, the present invention offers the advantages as follows:

1. The 3D-structured pattern reading system of the present invention can utilize a variable focal length of a liquid lens to read a 3D-structured pattern of an object.

2. The 3D-structured pattern reading system of the present invention can provide a novel 3D encryption system for anti-counterfeiting applications.

3. The portable 3D-structured pattern reading apparatus of the present invention can provide an authentication tool for a 3D encryption system.

As a result, the designs of the present invention have brought forth a compact and robust solution for 3D reading applications, and a 3D encryption scheme can be included therein to further enhance the access security of the applications.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A 3D-structured pattern reading system, including:
   an object having a front face formed with a 3D-structured pattern for representing predetermined data; and
   a reading device including a camera unit and a liquid lens unit, wherein the liquid lens unit has a variable focal length controlled by the camera unit to scan the 3D-structured pattern to derive the predetermined data with the object being placed at a distance not exceeding a maximum limit of the variable focal length from the liquid lens unit.

2. The 3D-structured pattern reading system of claim 1, wherein the 3D-structured pattern includes at least two planar patterns at different planes perpendicular to a normal line of the front face, and the at least two planar patterns carry information of the predetermined data.

3. The 3D-structured pattern reading system of claim 2, wherein at least one of the at least two planar patterns is encrypted.

4. The 3D-structured pattern reading system of claim 1, wherein the camera unit includes an information processing unit for performing an image processing procedure on the at least two planar patterns to derive the predetermined data.

5. The 3D-structured pattern reading system of claim 4, wherein the image processing procedure includes a deciphering procedure.

6. The 3D-structured pattern reading system of claim 1, wherein the camera unit further includes a light source.

7. The 3D-structured pattern reading system of claim 1, wherein the reading device further includes a recession space accommodating the liquid lens unit and the recession space has a depth less than the maximum limit of the variable focal length.

8. The 3D-structured pattern reading system of claim 1, wherein the reading device further includes at least one status indicator for indicating at least one operation status.

9. The 3D-structured pattern reading system of claim 1, wherein the object is a label on a product or a card for accessing a resource or entering a controlled space.

10. A portable 3D-structured pattern reading apparatus, including:
   a camera unit and a liquid lens unit, wherein the liquid lens unit has a variable focal length controlled by the camera unit for scanning a 3D-structured pattern on an object to derive predetermined data represented by the 3D-structured pattern with the object being placed at a distance not exceeding a maximum limit of the variable focal length from the liquid lens unit; and
   at least one status indicator for indicating at least one operation status of the camera unit.

* * * * *